No. 774,928.

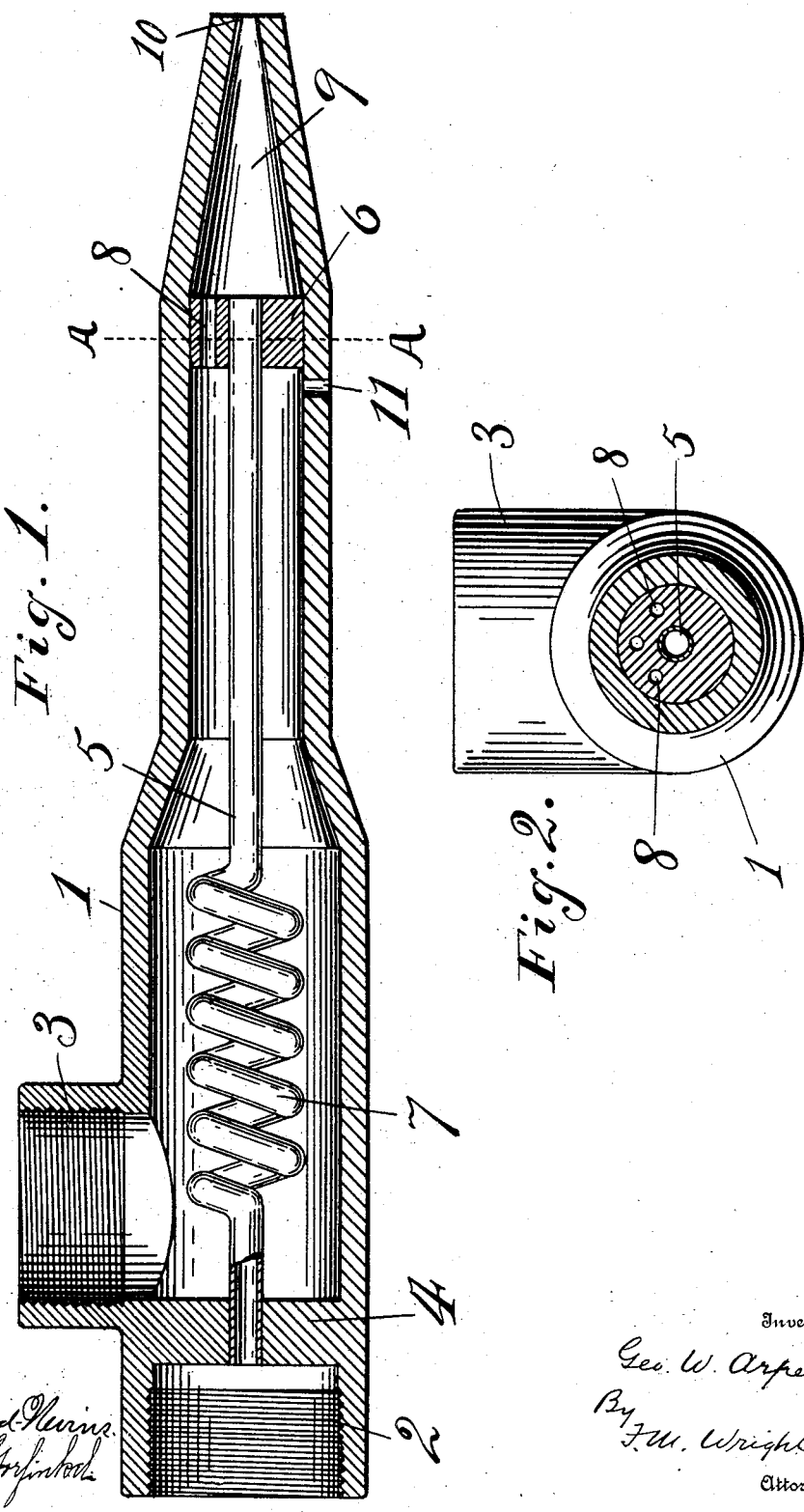

Patented November 15, 1904.

UNITED STATES PATENT OFFICE.

GEORGE W. ARPER, OF OAKLAND, CALIFORNIA.

OIL-BURNER.

SPECIFICATION forming part of Letters Patent No. 774,928, dated November 15, 1904.

Application filed February 18, 1904. Serial No. 194,122. (No model.)

*To all whom it may concern:*

Be it known that I, GEORGE W. ARPER, a citizen of the United States, residing at Oakland, in the county of Alameda and State of California, have invented certain new and useful Improvements in Oil-Burners, of which the following is a specification.

My invention relates to improvements in oil-burners, especially such as are adapted for use with stoves or small furnaces and in which steam is used first to heat the oil and then to spray the same. In this class of oil-burner a comparatively small quantity of steam is required to atomize or spray the oil. It has heretofore been attempted to utilize the same steam first to heat the oil and afterward to atomize or spray the same. This practice has been inefficient, and I have found as the result of experiments that if the steam which was sufficient to heat the oil to the required degree is afterward used to atomize the oil the combustion is poor, because the quantity of steam so escaping is too great for the flow of the oil. If, on the other hand, only so much steam is allowed to escape in proximity to the oil-orifice as is necessary to spray the same, this smaller quantity of steam is insufficient to heat the oil. I have discovered a construction avoiding both of these drawbacks.

A further object of my invention is to provide means whereby a large heating-surface may be provided for the oil without at the same time unduly lengthening the burner and, furthermore, in conjunction with the above objects to maintain the oil and steam separate from each other until the oil is thoroughly heated by the steam.

My invention therefore resides in the novel construction, combination, and arrangement of parts for the above ends hereinafter fully specified, and particularly pointed out in the claims.

In the accompanying drawings, Figure 1 is a longitudinal section of my improved burner, the oil-pipe being shown in side elevation except in one portion thereof, where it is broken away. Fig. 2 is a cross-section on the line A A of Fig. 1.

Referring to the drawings, 1 represents the burner-casing, having an internally-threaded portion 2 for connection with the oil-supply and an internally-threaded portion 3 for connection with the steam-supply. The burner is formed with a partition 4 separating the two connections, and into said partition is secured the rear end of the oil-pipe 5, the front end of said oil-pipe being supported in a partition 6 in the front end of the burner. These partitions, together with the casing 1 of the burner, form a steam-chamber in which the oil is heated before being discharged.

In order to obtain the maximum heating effect, I form said oil-pipe in a coil, as shown at 7, thereby obtaining a large heating-surface in proportion to the length of the coil.

Steam escapes through openings 8 in the partition 6 above the mouth of the oil-pipe, and the steam is commingled with the oil in the chamber 9 and is discharged at the orifice 10.

In order to permit of a large quantity of steam being supplied to heat the oil-pipe without discharging an excess of steam at the nozzle of the burner, I provide an orifice 11 in the lower portion of the burner near the front end of the steam-chamber. The excess of steam not required to spray the oil is permitted to escape through this orifice, and it is made of suitable dimensions to allow just the right proportion of steam to so escape.

I claim—

1. An oil-burner having a steam-chamber, a spirally-shaped oil-pipe therein adapted to be heated by the steam in said chamber, said chamber having an orifice permitting the steam to escape adjacent to the oil-outlet to spray the oil, and a separate orifice permitting the escape of steam remote from the oil-orifice, whereby an excess of steam may be used to heat the oil, substantially as described.

2. An oil-burner comprising a casing, partitions forming with said casing a steam-chamber, a spirally-shaped oil-pipe passing through said steam-chamber and having its ends opening into said partitions, the front partition having an orifice for the escape of steam into proximity to the oil-orifice, and the casing of the burner having near said front partition but on the opposite side to the above steam-orifice a second steam-orifice for the discharge of steam remote from the oil-discharge, substantially as described.

In witness whereof I have hereunto set my hand in the presence of two subscribing witnesses.

GEO. W. ARPER.

Witnesses:
CHAS. C. DAVISON,
FRANCIS M. WRIGHT.